United States Patent [19]
Light et al.

[11] Patent Number: 5,283,295
[45] Date of Patent: Feb. 1, 1994

[54] POLYMER BLENDS USEFUL FOR FORMING EXTRUSION BLOW MOLDED ARTICLES

[75] Inventors: Ronald R. Light; James W. Mercer, Jr., both of Kingsport, Tenn.

[73] Assignee: Eastman Kodak Company, Rochester, N.Y.

[21] Appl. No.: 895,069

[22] Filed: Jun. 8, 1992

[51] Int. Cl.$^5$ ............................................. C08L 67/02
[52] U.S. Cl. ................................... 525/439; 525/444; 525/466; 428/35.7
[58] Field of Search .......................................... 525/439

[56] References Cited

U.S. PATENT DOCUMENTS

| | | | |
|---|---|---|---|
| 3,218,372 | 11/1965 | Okamura et al. | 260/860 |
| 4,123,473 | 10/1978 | Amin et al. | 260/860 |
| 4,175,147 | 11/1979 | Bollen et al. | 428/35 |
| 4,230,656 | 10/1980 | Amin et al. | 264/171 |
| 4,788,251 | 11/1988 | Brown et al. | 525/67 |

*Primary Examiner*—Patricia A. Short
*Attorney, Agent, or Firm*—John F. Stevens; William P. Heath, Jr.

[57] ABSTRACT

Disclosed is a polymer blend having excellent clarity and impact strength which is suitable for use in extrusion blow molding processes comprising
  a) about 50-95 wt % of a polyester having repeat units from at least 95 mol % terephthalic acid, at least 90 mol % ethylene glycol and up to 10 mol % 1,4-cyclohexanedimethanol, the polyester having a weight average molecular weight of 75,000-85,000,
  b) about 40-4 wt % of recycled scrap polyester having repeat units from at least 90 mol % terephthalic acid and at least 90 mol % ethylene glycol and having a molecular weight of about 40,000-55,000, and
  c) about 1-10 wt % of a polymeric material containing at least 90 wt % polycarbonate and up to 10 wt % polyethylene terephthalate.

5 Claims, No Drawings

POLYMER BLENDS USEFUL FOR FORMING EXTRUSION BLOW MOLDED ARTICLES

TECHNICAL FIELD

This invention relates to polymer blends useful for forming extrusion blow molded articles, which blends contain a high molecular weight polyethylene terephthalate (PET), a lower molecular weight recycled scrap polyethylene terephthalate, and a small amount of polycarbonate.

BACKGROUND OF THE INVENTION

Composition of matter patents relating to polycarbonate and poly(ethylene terephthalate) alloys include U.S. Pat. No. 3,218,372. The alloys described in this patent contain 5 to 95 wt % polycarbonate blended with 95 to 5 wt % poly(ethylene terephthalate). Other patents pertaining to polycarbonate and poly(ethylene terephthalate) alloys include U.S. Pat. No. 4,123,473, U.S. Pat. No. 4,175,147, U.S. Pat. No. 4,230,656 and U.S. Pat. No. 4,788,251. However, none of these disclose an extrusion blow molded container produced from a high molecular weight poly(ethylene terephthalate) having a weight average molecular weight of between about 75,000 and about 85,000 blended with about 4 to about 40 wt % recycled scrap poly(ethylene terephthalate) having a weight-average molecular weight of between about 40,000 and about 55,000 and about 1.0 wt % to about 10.0 wt % polycarbonate or a polycarbonate/poly(ethylene terephthalate) concentrate as a melt strength enhancer.

Recent development work has shown that high molecular weight (weight average molecular weight of about 75,000 to about 85,000) poly(ethylene terephthalate) modified with small amounts of 1,4 cyclohexanedimethanol has sufficient melt strength for extrusion blow molding on conventional extrusion blow molding machines into containers in sizes up to about 2 liters. It would be helpful for extrusion blow mold operators to be able to use up to about 25 wt % recycled PET such as scrap from PET bottles (weight average molecular weight between about 40,000 and about 55,000), combined with neat PET when producing these containers. However, when 25 wt % to 50 wt % recycled material is combined with neat PET during the extrusion blow molding process, the melt strength is reduced significantly which makes it very difficult to hang (extrude vertically) parisons for producing containers.

It has been discovered that the melt strength of high molecular weight poly(ethylene terephthalate) containing about 25 wt % to about 50 wt % recycled scrap PET can be increased by adding a small amount of a neat polycarbonate or a mixture of about 75 to about 90 wt % polycarbonate with about 25 to about 10 wt % PET or poly(ethylene-co-3,5-1,4-cyclohexylenedimethylene terephthalate) alloy. This discovery will allow extrusion blow molders of the high molecular weight poly(ethylene terephthalate) to produce containers containing recycled PET scrap material that, otherwise, could not be done satisfactorily due to a significant decrease in melt strength when the lower molecular weight recycled material is added back to the process.

Normally, it is impossible to extrusion blow mold a large container from PET having a molecular weight in the range of 40,000 to 55,000 because of insufficient melt strength. However, if the PET is blended with a higher molecular weight neat PET and a polycarbonate in accordance with this invention, the material has sufficient melt strength to hang a parison for the extrusion blow molding process. Due to environmental concerns and public pressure, those who use containers produced from the extrusion blow moldable high molecular weight poly(ethylene terephthalate) would like to be able to use recycled poly(ethylene terephthalate) bottle scrap normally from bottles. However, when the lower molecular weight bottle scrap is combined with the higher molecular weight poly(ethylene terephthalate), the melt strength of the higher molecular weight poly(ethylene terephthalate) is reduced significantly which makes it difficult to extrusion blow mold a good quality container. Adding a small amount of neat polycarbonate or a polycarbonate/poly(ethylene terephthalate) alloy increases the melt strength of the high molecular weight poly(ethylene terephthalate)/lower molecular weight recycled PET to a level equal to or greater than that of the neat high molecular weight poly(ethylene terephthalate) which results in sufficient melt strength to produce good quality containers.

DESCRIPTION OF THE INVENTION

According to the present invention, there is provided a polymer blend having excellent clarity and impact strength which is suitable for use in extrusion blow molding processes comprising a) about 50–95 wt % of a polyester having repeat units from at least 95 mol % terephthalic acid, at least 90 mol % ethylene glycol and up to 10 mol % 1,4-cyclohexanedimethanol, the polyester having a weight average molecular weight of 75,000–85,000, b) about 40–4 wt % of a recycled scrap polyester having repeat units from at least 90 mol % terephthalic acid and at least 90 mol % ethylene glycol and having a molecular weight of about 40,000–55,000, and c) about 1–10 wt % of a polymeric material containing at least 90 wt % polycarbonate and up to 10 wt % poly(ethylene terephthalate), wherein a), b) and c) above total 100%.

Poly(ethylene terephthalate) resins which may be used in the blends of the present invention are well known and are available commercially and methods for their preparation are described, for example, in U.S. Pat. No. 2,465,319 and U.S. Pat. No. 3,047,539.

The dicarboxylic acid component may contain up to about 10 mol % of other conventional aromatic, aliphatic or alicyclic dicarboxylic acids or polyfunctional anhydrides such as isophthalic acid, naphthalenedicarboxylic acid, cyclohexanedicarboxylic acid, succinic acid, sebacic acid, adipic acid, glutaric acid, azelaic acid and the like.

The glycol component may contain up to about 10 mol % of other conventional aliphatic or alicyclic glycols such as diethylene glycol, triethylene glycol, ethylene glycol, propanediol, butanediol, pentanediol, hexanediol, and the like.

Higher molecular weight PET and PET modified with up to about 10 mol % 1,4-cyclohexanedimethanol, i.e., weight average of about 75,000–85,000 may be made by conventional methods such as melt phase polymerization followed by polymerization in the solid phase. I.V.s (inherent viscosity) representing these molecular weights are about 0.9 to about 1.1, preferably about 0.95. The PET may be modified up to about 10 mol % with other conventional polyfunctional glycols, acids, and anhydrides.

Scrap or recycled PET is intended to mean PET which has been used and salvaged. Perhaps the greatest amount of scrap or recycled PET comes from beverage bottles. Typically, used bottles are collected and processed by first removing non PET debris. Also, the bottles may have a non PET base such as a polyolefin, which is also removed. The bottles are conveyed along a path for separation of colored and non PET containers. The bottles are then granulated into the desired size particles. The particles may be melted and repelletized if desired. Any paper, light plastic labeling, glue, container caps, etc., is separated from the particles. The particles are then washed and dried.

To make pellets from recycled particles, the PET is first given back its molecular orientation that was altered during the recycling process. Using a crystallizer, the original two dimensional strength to the polymer structure is restored. The resultant material then passes through a dryer in preparation for extrusion/pelletizing process.

It is preferred that the polycarbonate be blended with up to about 10 weight % of PET or PET modified with up to about 10 mol % 1,4-cyclohexanedimethanol which acts as a compatibilizer to improve mixing and subsequent clarity of the products.

Polycarbonate resins which are suitable for use in the present invention are well known in the art and are generally commercially available. These polycarbonates may be prepared by a variety of conventional and well known processes which include transesterification, melt polymerization, interfacial polymerization, etc. The polycarbonates are generally prepared by reacting a dihydric phenol with a carbonate precursor, such as for example, phosgene. Suitable processes for preparing the polycarbonates of the present invention are described in, for example, U.S. Pat. Nos. 4,018,750, 4,123,436 and 3,153,008. However, other known processes for producing polycarbonates are suitable. Particularly preferred polycarbonates are aromatic polycarbonates, prepared by reacting bisphenol-A [2,2-bis(4-hydroxyphenyl)propane] with phosgene.

The impact modified blends of the present invention may be subject to conventional processing methods such as injection molding, extrusion, etc. Prior to such processing, pellets of the neat PET, pellets or particles of recycled PET and pellets of polycarbonate are mixed at the desired ratios. Specific industrial applications may require the addition of conventional additives such as stabilizers, pigments, flame retardants, fillers, reinforcing agents, and/or processing aids. Such additives may be added to the blends of the present invention in any amounts which do not significantly alter the physical properties of the blend.

Other features of the invention will become apparent in the course of the following descriptions of exemplary embodiments which illustrate the invention and are not intended to be limiting thereof.

The blends were extrusion blow molded into 10-ounce 24 mm narrow mouth containers on a Bekum H-121S extrusion blow molding machine equipped with an 80-mm high density polyethylene screw and a single head with a 0.70-inch die and a 0.56-inch mandrel. Melt strength improvements were evaluated by measuring the time and weight of an extruded parison from the molding machine to travel a distance of 24 inches below the die tip opening for a given die gap setting. The initial die gap setting, extruder screw speed and temperatures were established for a control sample and allowed to remain constant for all subsequent measurements on samples containing different levels of the melt strength enhancer.

The neat polyester used in the examples is poly(ethylene terephthalate) modified with about 3.5 mol % 1,4-cyclohexanedimethanol having an I.V. of about 0.95, which is about 80,000 weight average molecular weight. The recycled PET is in the form of flakes or chips from ground beverage bottles, and has a weight average molecular weight of about 45,000.

EXAMPLE 1

A neat polyester control sample was dried at 350° F. for 4 hours in a dryer and extrusion blow molded on the extrusion blow molding machine at a melt temperature of around 450° F. to 500° F. The die gap was set at about 16% on the electronic control panel and the extruder speed was maintained at around 10 rpm. An average parison drop time for the extruded parison to travel a distance of about 24 inches was around 17 seconds. The average weight of the parison produced during this time for the control was about 56 grams for this set of conditions. Twenty-five containers produced under these conditions were submitted for drop testing. Each container was filled with water, capped and dropped from a platform on to a metal plate from a predetermined height. The height at which 50% of the containers would pass without failing was recorded. The 10-ounce containers produced from the extrusion blow moldable control sample had an average drop height impact of around 4.2 feet.

EXAMPLE 2

In this Example, 75 wt % neat polyester was mixed with 25 wt % recycled PET bottle scrap having a weight-average molecular weight between 40,000 and 50,000. Using conditions similar to those described in Example 1, the neat polyester containing 25 wt % scrap sample was also extrusion blow molded into 10-ounce containers on the same extrusion blow molding machine The average drop time for the molten parison to cover the same distance as described in Example 1 was 16 seconds and it weighed 50 grams. The 10-ounce containers produced from this composition had an average drop height of 3.4 feet, where 50% of the containers would pass without breaking. Adding 25 wt % scrap PET to neat polyester lowered the drop impact height about 19%.

While continuing the extrusion of the 75 wt % neat polyester having a weight average molecular weight between 75,000 and 85,000 dry mixed with 25 wt % scrap PET flake having a weight-average molecular weight between 40,000 and 50,000 under the conditions similar to those in Example 1, 1.5 wt % of a 90/10 melt blend of polycarbonate from phosgene and bisphenol A [Malrolon (trademark) 3118] with PET was metered into the feed throat of the blow molding machine. After waiting for a period of about 20 minutes, the parison drop times and weights were measured again without changing the die gap and extruder speed settings In this example, the average parison drop time was around 22 seconds which is about 30% longer than the time that was obtained on the sample described in Example 1 and about 37% longer than the time obtained on the sample described in Example 2. The average parison weight was about 66 grams which is about 19% heavier than the ones produced in Example 2. The drop height on the containers produced in this example averaged about 4.4 feet which is essentially as good as the control sample described in Example 1 and about 30% better than the drop height obtained on containers produced from the neat PET/25 wt % scrap PET sample described in Example 2. It was totally unexpected to improve the drop impact strength of the neat PET containing 25 wt % scrap PET by adding a small amount of the 90/10 polycarbonate/PET concentrate.

EXAMPLE 3

While continuing to extrude the 75 wt % neat polyester PET mixed with 25 wt % scrap PET bottle flake under the conditions given in Example 1, the level of the 90/10 melt blended polycarbonate/neat PET concentrate was increased to 3.5 wt %. The parison drop time over the 24-inch distance increased to 26 seconds and the parison weight increased to 74 grams which is an improvement in drop time and parison weight of 62% and 48%, respectively. Again, it was surprising to see that the drop impact of the PET/25 wt % scrap PET increased from a 3.5-feet drop height to 4.5-feet drop height when the low level of 90/10 polycarbonate/neat PET concentrate was added.

EXAMPLE 4

This Example is given to demonstrate that it is also possible to obtain these improvements in parison hang time and weight and container drop impact strength even when a low level of neat polycarbonate is added to the 75% wt % PET/25 wt % scrap PET mixture. The 75/25 neat PET/PET scrap mixture was extrusion blow molded under the conditions given in Example 1 except in this Example 1.5 wt % was added to the extruder with the plasticolor additive feeder. After waiting 20 minutes to allow the neat polycarbonate be thoroughly mixed with the neat PET/25 wt % scrap PET, the parison drop time was found to about 19 seconds and the parison weight about 57 grams. Again, this was an increase of about 19% in drop time and about 14% in parison weight. The container drop impact strength of about 29% over the drop impact strength of the same type of container produced from the neat PET/25 wt % scrap PET without any modification which was totally unexpected.

The results of the above examples are given in the following table for comparison.

TABLE 1

| Material | 24 inch Drop Time, sec | Parison wt, g | Bottle Drop Ht, ft |
|---|---|---|---|
| Neat PET Control | 17 | 56 | 4.2 |
| Neat PET + 25 wt % Scrap PET | 16 | 50 | 3.4 |
| Neat PET + 25 wt % Scrap PET + 1.5 wt % (90/10 Polycarbonate/PET Conc.) | 22 | 66 | 4.4 |
| Neat PET + 25 wt % Scrap PET + 3.5 wt % (90/10 Polycarbonate/PET Conc.) | 26 | 74 | 4.5 |
| Neat PET + 25 wt % Scrap PET + 1.5 wt % Polycarbonate | 19 | 57 | 4.4 |

As used herein, inherent viscosity (I.V) is measured at 25° C. using 0.50 gram of polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention.

We claim:

1. A polymer blend having excellent clarity and impact strength which is suitable for use in extrusion blow molding processes comprising
   a) about 50-95 wt % of a polyester having repeat units from at least 95 mol % terephthalic acid, at least 90 mol % ethylene glycol and up to 10 mol % 1,4-cyclohexanedimethanol, said polyester having a weight average molecular weight of 75,000-85,000,
   b) about 40-4 wt % of recycled scrap polyester having repeat units from at least 90 mol % terephthalic acid and at least 90 mol % ethylene glycol and having a weight average molecular weight of about 40,000-55,000, and
   c) about 1-10 wt % of a polymeric material containing at least 90 wt % polycarbonate and up to 10 wt % polyethylene terephthalate.

2. A polymer blend according to claim 1 wherein said polymeric material of c) is polycarbonate.

3. A polymer blend according to claim 1 wherein said polyester of a) consists essentially of repeat units from terephthalic acid, about 95-99 mol % ethylene glycol and about 5-1 mol % 1,4-cyclohexanedimethanol.

4. An extrusion blow molded article comprising the polymer blend of claim 1.

5. A polymer blend having excellent clarity and impact strength which is suitable for use in extrusion blow molding processes comprising
   a) about 50-95 wt % of a polyester having repeat units from at least 95 mol % terephthalic acid, at least 90 mol % ethylene glycol and up to about 10 mol % of at least one other polyfunctional acid, glycol or anhydride, said polyester having a weight average molecular weight of 75,000-85,000,
   b) about 40-4 wt % of recycled scrap polyester having repeat units from at least 90 mol % terephthalic acid and at least 90 mol % ethylene glycol and having a weight average molecular weight of about 40,000-55,000, and
   c) about 1-10 wt % of a polymeric material containing at least 90 wt % polycarbonate an up to 10 wt % polyethylene terephthalate.

* * * * *